United States Patent [19]
Cremona et al.

[11] Patent Number: 6,072,424
[45] Date of Patent: Jun. 6, 2000

[54] METHOD FOR MEASURING THE GROUND SPEED OF A VEHICLE BY MEANS OF RADAR USING REFLECTION OF ELECTROMAGNETIC WAVES FROM THE DRIVING SURFACE

[75] Inventors: Patrick Cremona, Montrabe, France; Martin Kunert, Geisling, Germany

[73] Assignee: Siemens Automotive S.A., Toulouse, Cedex, France

[21] Appl. No.: 09/077,724

[22] PCT Filed: Nov. 5, 1996

[86] PCT No.: PCT/EP96/04829

§ 371 Date: Jun. 5, 1998

§ 102(e) Date: Jun. 5, 1998

[87] PCT Pub. No.: WO97/21111

PCT Pub. Date: Jun. 12, 1997

[30] Foreign Application Priority Data

Dec. 5, 1995 [FR] France .................................. 95 14525

[51] Int. Cl.[7] ...................................................... G01S 13/60
[52] U.S. Cl. ......................... 342/109; 342/110; 342/115; 342/70
[58] Field of Search .................................. 342/70, 71, 72, 342/104, 106, 107, 109, 110, 115, 117

[56] References Cited

U.S. PATENT DOCUMENTS

| | | | |
|---|---|---|---|
| 3,835,361 | 9/1974 | Schubring | 318/561 |
| 3,848,253 | 11/1974 | Genuist et al. | 342/149 |
| 4,143,370 | 3/1979 | Yamanaka et al. | 342/72 |
| 4,210,399 | 7/1980 | Jain | 356/28.5 |
| 4,403,220 | 9/1983 | Donovan | 342/29 |
| 4,740,045 | 4/1988 | Goodson et al. | 342/112 |
| 5,314,037 | 5/1994 | Shaw et al. | 180/169 |
| 5,510,794 | 4/1996 | Asbury et al. | 342/42 |
| 5,517,196 | 5/1996 | Pakett et al. | 342/70 |

FOREIGN PATENT DOCUMENTS 2 076 610  12/1981  United Kingdom .

*Primary Examiner*—John B. Sotomayor
*Attorney, Agent, or Firm*—Herbert L. Lerner; Laurence A. Greenberg; Werner H. Stemer

[57] ABSTRACT

A method for measuring the speed (V) of a vehicle (1) relative to the ground, of the type using the deviation in frequency associated with the Doppler effect between a transmitted wave (3) sent by radar (2) solidly connected to the vehicle and a reflected wave (4) reflected by the ground, characterized in that radar of the type allowing simultaneous measurement of the relative distance (D) and the relative speed (V) between the vehicle and the ground is used, and that the distance measurement is used to validate the speed measurement.

4 Claims, 1 Drawing Sheet

METHOD FOR MEASURING THE GROUND SPEED OF A VEHICLE BY MEANS OF RADAR USING REFLECTION OF ELECTROMAGNETIC WAVES FROM THE DRIVING SURFACE

BACKGROUND OF THE INVENTION

1. Field of the Invention

The present invention relates to a method for measuring the speed of a vehicle relative to the ground by means of radar, using the reflection of electromagnetic waves from the roadway.

2. Description of the Related Art

The speed of a vehicle relative to the ground is conventionally measured by using the rotary speed of the vehicle wheels, and more particularly of the nondriven wheels. However, in certain cases, such as if these wheels lock during braking or in vehicles with all-wheel drive, this speed measurement may be erroneous. Hence other methods for measuring the speed have been proposed, for example utilizing the Doppler effect.

From the prior art, for instance U.S. Pat. No. 5,243,564, a device for measuring the speed of a motor vehicle is known that utilizes the modification, caused by the Doppler effect, of the frequency of an ultrasonic wave transmitted by the vehicle and reflected by the ground back to it. In this reference, it is proposed that one of the problems associated with this type of measurement, in this case the influence of the horizontal position of the vehicle on the measurement be compensated for by means of a device using the rotary speed of the wheels, measured by an antilock brake system, to determine a load transfer angle of the vehicle. However, aside from the fact that such a system is expensive because it requires equipping the vehicle with an antilock brake system, the measurement that can be obtained with it can still be incorrect. In fact, especially if an electromagnetic wave (radar wave) is employed to improve precision, difficulties are still encountered from numerous perturbation factors intrinsic to the traffic field. In particular, the wave reflected to the receiver in the vehicle may have traversed multiple courses or have been reflected by parasitic targets. As a consequence, the frequency analysis performed to extract the speed information may easily be perturbed by these conditions and lead to erroneous results, which are all the harder to detect since they are at least plausible.

SUMMARY OF THE INVENTION

Hence the object of the present invention is to furnish a method for measuring the speed of a vehicle relative to the ground, the results of which have increased reliability without requiring additional equipment.

These objects of the invention as well as others which will become apparent from the ensuing description, are attained by a method for measuring the speed of a vehicle relative to the ground, of the type using the deviation in frequency associated with the Doppler effect between a transmitted wave sent by radar solidly connected to the vehicle and a reflected wave reflected by the ground, characterized in that radar of the type allowing simultaneous measurement of the relative distance and the relative speed between the radar and a target is used, and that the distance measurement is used to validate the speed measurement.

In an important characteristic of the present invention, the speed measurement is eliminated, if the associated distance measurement is not within a predetermined range of distance that brackets a fixed distance corresponding to the distance of the radar from the ground. Advantageously, this distance range may be variable as a function of the measurements of the vehicle speed made previously.

Further characteristics and advantages of the method of the invention will become apparent from the ensuing description and from a study of the appended drawings, in which:

DESCRIPTION OF THE PREFERRED EMBODIMENT

Figure 1:
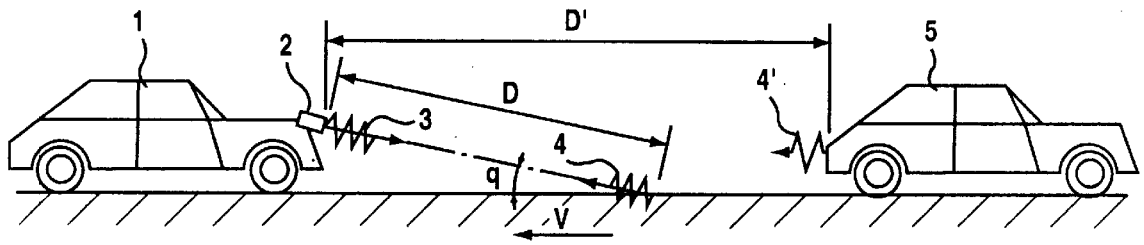
FIG. 1 shows a vehicle equipped with a device for measuring the speed in a situation that involves risks of perturbation.

Turning to FIG. 1, a motor vehicle 1 equipped with radar 2 is shown. This radar transmits an electromagnetic wave 3 in the direction of the ground at an incidence q and receives as an echo a reflected wave 4. Conventionally, by analyzing the variation in frequency of the reflected wave 4 relative to the transmitted wave 3, associated with the Doppler effect, the relative speed V of the ground with respect to the vehicle can be deduced by the following equation:

$$V = \frac{c \times \Delta F}{(F_T + F_R) \times \cos\theta}$$

in which $F_T$ is the frequency of the transmitted wave, $F_R$ is the frequency of the wave received as an echo by the radar, $\Delta F = F_R - F_T$ is the difference in frequency due to the Doppler effect, and c is the speed of wave propagation. However, under normal usage conditions, the transmitted wave 3 may also be reflected by numerous fixed or moving obstacles, such as a vehicle 5 ahead of the vehicle 1 equipped with the radar. In that case the radar also receives a parasitic echo 4' reflected by the vehicle 5. Because of this, the echo received by the radar 2 has a composite frequency $F_R$, corresponding to the combination of the echoes 4 and 4' and associated with the relative respective speeds of the ground and the vehicle 5 with regard to the vehicle 1.

Aside from the solution consisting of comparing the speed obtained by processing the radar signal with speed information obtained for instance by means of a conventional device that measures the rotary speed of the vehicle wheels, an attempt made be made to resolve this indeterminateness by suitable filtering of the frequency received, for example using a Kalman filter, with which the peak frequency corresponding to the echo from the ground can be tracked. However, aside from the fact that such a solution requires an initialization procedure performed in the absence of parasitic echoes, it has been possible to demonstrate that it may be defective as well, for example when the vehicle 5 is stopped while located within the radar field and then accelerates. In that case, the filter may fix on the parasitic echo 4' and furnish a resultant speed that while plausible is actually wrong. This is particularly true if the echo originating at the ground is weak, as is the case on soft ground, in which case the parasitic echo becomes predominant.

Figure 2:
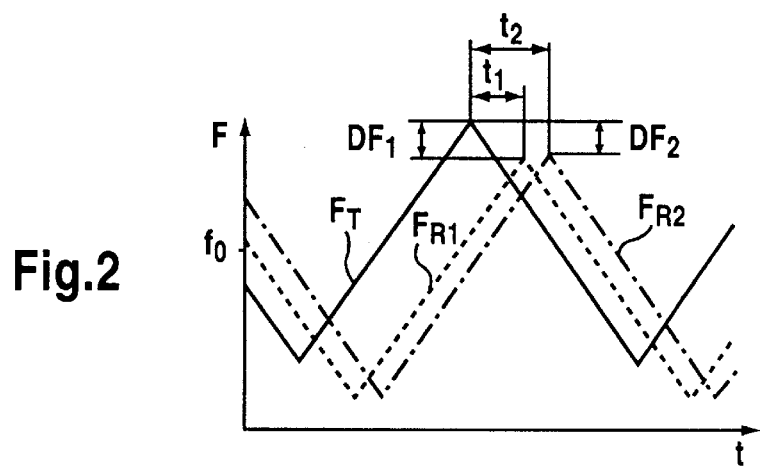
FIG. 2 is a diagram of the waves transmitted and received by radar of the FMCW type, which is useful for the sake of comprehension of the invention.

According to the invention, radar with which a measurement of the relative distance and of the relative speed can be obtained simultaneously is used, such as Doppler pulse radar, or in the example below radar of the frequency modulated continuous wave type, better known as FMCW radar. This type of radar, known per se, for which the waves transmitted and received are plotted over time in a graph in FIG. 2, has the advantage of simultaneously providing a measurement of the speed and the distance of the radar relative to an object. This radar emits an incident wave of frequency $F_T$ that is frequency-modulated, for example by a triangular modulation around a central frequency $f_0$. The echo received in the radar in the case of FIG. 1 may be broken down by suitable filtering into two frequencies $F_{R1}$ and $F_{R2}$. It can then be demonstrated that the chronological offsets $t_1$ and $t_2$, corresponding to the wave propagation time and hence to the distance between the radar and the target, and the frequency offsets $DF_1$ and $DF_2$, corresponding to the difference in frequency due to the Doppler effect and hence to the relative speed of the targets, which are conventionally calculated by a linear combination of the ascending and descending beat frequencies make it possible to define pairs (speed; distance) $(V_1, D_1)$ and $(V_2, D_2)$, corresponding to the frequencies $F_{R1}$ and $F_{R2}$, respectively. Since the distance D of the radar from the ground is fixed by construction, it thus becomes possible, by comparing the distances obtained with this distance D, to distinguish which of the two pairs corresponds to the measurement sought.

It is understood that this analysis, which can be done with more that two frequencies, is not necessary for each measurement. By using suitable filtration and seen above, it is possible to dispense with a complete analysis except upon initialization, or if an error in measurement is encountered.

Figure 3:
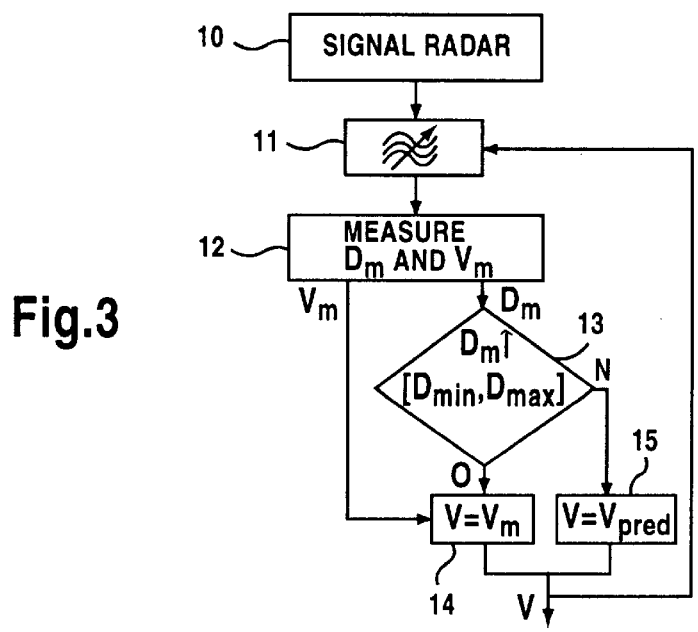
FIG. 3 is a flowchart of the method of the invention.

The method is schematically shown in FIG. 3. The radar signal received in step 10 is filtered in step 11 by an adjustable filter. This filtration selects one of the frequency peaks received. On the basis of the frequency selected, in step 12 the pair comprising the measured distance $D_m$ and the measured speed $V_m$ is calculated. In step 13, it is then verified that the measured distance is within a range of distances $[D_{min}; D_{max}]$ that brackets the fixed distance D. This range may advantageously be defined as a function of the speed values measured beforehand. For example, when the previous measurements show vehicle acceleration, the range may be widened by increasing the value of $D_{max}$ in order to take the load transfer of the vehicle into account. If the distance measured is within the distance range, one proceeds to step 14, where the speed $V_m$ is retained as the speed V of the vehicle. Conversely, in step 15, the vehicle speed V is assigned a speed predicted by extrapolation from the previous measurements. As a function of the result retained for the vehicle speed, in the filtration step 11 action is taken either to slave the filter to the current frequency, if the measured speed has been retained, or to select a different peak frequency if the speed measured did not correspond to the relative speed of the vehicle with regard to the ground.

We claim:

1. A method of measuring a speed of a vehicle relative to ground, which comprises:
    providing a radar device rigidly connected on a vehicle, said radar device being adapted to simultaneously measure a relative distance (Dm) and a relative speed (Vm) between the radar device and a target;
    measuring the relative distance between the radar device and a reflection point on the ground;
    simultaneously measuring a relative speed between the radar device and the ground; and
    validating the speed measurement with the measured distance between the radar device and the reflection point on the ground.

2. The method according to claim 1, which comprises eliminating the speed measurement whenever the associated distance measurement lies outside a given range of distances bracketing a fixed distance of the radar from the ground.

3. The method according to claim 2, which further comprises varying the given range of distances as a function of a preceding speed measurement.

4. The method according to claim 2, wherein the step of measuring the relative speed comprises calculating a Doppler effect frequency shift between a radar wave transmitted by the radar device and a reflected wave received by the radar device.

* * * * *